United States Patent [19]

Moore et al.

[11] 4,076,255
[45] Feb. 28, 1978

[54] GOLF BALLS

[75] Inventors: Travis Moore; Hugh David Niblock, both of Dumfries, Scotland

[73] Assignee: Uniroyal Limited, Scotland

[21] Appl. No.: 641,477

[22] Filed: Dec. 17, 1975

[30] Foreign Application Priority Data

Dec. 30, 1974 United Kingdom ............... 56037/74

[51] Int. Cl.² ............................................. A63B 37/06
[52] U.S. Cl. ..................................... 273/226; 260/42;
260/47; 260/879; 260/880 R; 273/227;
273/230; 273/DIG. 10; 526/29
[58] Field of Search ............... 526/29; 260/879, 42.47;
273/218, 222, 226, 330, 227

[56] References Cited

U.S. PATENT DOCUMENTS 3,819,768  6/1974  Molitov ............................ 260/897 B
3,833,633  9/1974  Owen et al. ........................... 526/29

FOREIGN PATENT DOCUMENTS 2,557,923  7/1976  Germany ............................. 273/230
2,343,385  3/1974  Germany ............................. 260/879
1,364,138  8/1974  United Kingdom ................. 260/879

Primary Examiner—William F. Hamrock
Attorney, Agent, or Firm—Anthony Lagani

[57] ABSTRACT

A golf ball center composition comprising by weight 100 parts of a resilient elastomer, not more than 25 parts of a monomer capable of grafting, cross-linking or chain-extending the elastomer and not less then 70 parts of an inert filler, the composition being cured and having a Shore C hardness of not less than 60°; a golf ball comprising said center, an elastic thread wound around the center to form a core, and a cover molded onto the core; and a method of making such golf ball.

19 Claims, No Drawings

GOLF BALLS

This invention relates to golf balls and their manufacture, and to a composition for use in the manufacture of golf balls. Until recently, virtually all golf balls were made by winding an elastic thread around a center and covering the core so formed with a cover of a tough, elastomeric material. The center was generally of a paste or liquid encased in an elastomeric sac and, in order to wind the thread onto the centers, the centers had to be frozen to give them the necessary hardness and rigidity.

More recently, there have been many proposals for the manufacture of solid golf balls, either as a unitary molding or as a two-piece structure in which a cover is molded onto a unitary pre-molded core. The objective has been to provide materials which will give a solid golf ball with properties similar to those of the traditionally manufactured ball, but without the need for such an elaborate manufacturing process. In particular, the step of winding the thread around the center has been eliminated. Generally speaking, solid golf balls have not been accepted as being of top class tournament standard and conventional wound-core balls still dominate the upper section of the market. Little attention has been paid to developing the center of wound-core balls.

According to the present invention a golf ball comprises a center, an elastic thread wound around the center to form a core, and a cover molded onto the core, the center being formed from a composition comprising a resilient elastomer and a monomer capable of grafting, cross-linking or chain-extending the elastomer, said composition being cured, and the cured composition having a Shore C hardness of not less than 60°.

By suitable selection of the components of the composition it is possible to manufacture golf balls which are the equal of, or better than, wound-core balls having liquid or paste centers. Furthermore, by using a composition of such hardness it is possible to wind the thread onto the center without first having to freeze the center. This greatly facilitates the handling of the centers during manufacture and leads to savings in labor costs, in wastage and reject costs, and in the cost of the medium used to freeze the centers. Furthermore, the centers and the finished balls will be more consistent, as variation in thawing of conventional cores during ball manufacture is eliminated.

A method of making a golf ball, according to the invention, comprises placing a center on a winding machine, the center being formed from a cured composition comprising a resilient elastomer and a monomer capable of grafting, cross-linking or chain-extending the elastomer and having a Shore C hardness of not less than 60°, winding an elastic thread around the center while the center is substantially at room temperature and molding a cover onto the wound center.

The winding process may be a conventional process wherein a single thread is wound onto the center. A number of such winding processes are known, but with a center hardness of the minimum 60° hardness not all will give good results. The preferred minimum hardness of the core is 70°, with which more processes are suitable. The winding process may preferably be a process wherein two or more threads are wound onto the core simultaneously. Such processes are described in U.S. Pat. No. 2,153,408 issued Apr. 4, 1939, the disclosure of which is incorporated herein by reference. It is found that the deformation of centers wound with a double thread may be substantially less than that of centers wound with a single thread. Thus, at least at the lower end of the preferred hardness range, say from 60° to 75° Shore C, centers are desirably wound with double thread.

The resilient elastomer component of the center is preferably polybutadiene (desirably with a cis-content of at least 50% by weight, preferably at least 80% and more preferably at least 96%), natural rubber, synthetic polyisoprene or blends of any two or all three of these polymers. Other polymers, such as styrene-butadiene copolymer or ethylene-propylene-diene terpolymer, may be used alone or in admixture with one or more of the aforesaid polymers but usually any such other polymer will detract from the quality of the finished ball. Most desirably the elastomer component is wholly polybutadiene with a cis-content of at least 96% by weight, as this is found to give excellent rebound properties to the finished ball. Hitherto, it has not been practical to use only polybutadiene as elastomer in a ball center, as this can not be frozen by solid carbon dioxide. By using polybutadiene in a center of 60° Shore C hardness or more, freezing becomes unnecessary and the resilience of this elastomer can be fully utilized.

The monomer in the center composition may be selected from a large number of monomers, which term is used in its broadest sense and is not restricted to monomeric units but includes partial polymers capable of further polymerization. Examples of such monomers includes an unsaturated carboxylic acid; a metal salt of an unsaturated carboxylic acid; an ester or anhydride of a monobasic or polybasic unsaturated acid, particularly a carboxylic acid; a metal salt of an ester of a polybasic unsaturated acid; a partial polymer containing residual polymerizable unsaturations; a metal salt of such a partial polymer; a metal salt of other polymerizable acidic organic compounds; a polyamino amide or imide of an unsaturated carboxylic acid; certain allyl and vinyl compounds; low molecular weight reactive polymers; and mixtures of any two or more of the above materials.

One particularly preferred group is the esters and anhydrides of monobasic or polybasic unsaturated acids, and preferred within this group are the polyol esters and anhydrides of acrylic, methacrylic, ethacrylic, crotonic, and cinnamic acids, the said polyols includng ethylene glycol, di-, tri-, and tetra-ethylene glycol, glycerol, 1,3-butylene glycol, 1,4-butylene glycol, trimethylolpropane, pentaerythritol, propylene glycol, di-, tri-, and tetrapropylene glycols, polyethylene glycol, and polypropylene glycol. Good examples of these are trimethylol propane trimethacrylate, trimethylol propane triacrylate, pentaerythritol tetramethacrylate, pentaerythritol tetracrylate, 1,6-hexane diol diacrylate, 1,3-butylene glycol dimethacrylate and ethylene glycol dimethacrylate. Other esters within the group that may be mentioned are the vinyl, allyl, methallyl, furfuryl, crotyl and cinnamyl esters of acids such as acetic, propionic, butyric, benzoic, phenylacetic, chloroacetic, trichloroacetic, oxalic, malonic, succinic, glutaric, adipic, pimelic, suberic, azelaic, sebacic, maleic, itaconic, citraconic, mesaconic, fumaric, citric, acotinic, phthalic, isophthalic, terephthalic, naphthalenedicarboxylic, mellitic, pyromellitic, trimesic, acrylic, methacrylic, ethacrylic, cinnamic, crotonic, and cyanuric; and the methyl, ethyl, propyl, butyl, pentyl, hexyl, benzyl, phenyl, cyclohexyl, chloroethyl, beta-cyanoethyl, dimethylaminoethyl, glycidyl, lauryl, 2-methoxyethyl, tetrahydrofurfuryl, hydroxyethyl and hydroxypropyl esters of acrylic, methacrylic, ethacrylic, cinnamic, crotonic, cyanuric, fumaric, maleic and methylmaleic acids.

Another particularly preferred group are the metal salts of unsaturated carboxylic acids, the metal ions preferably being uncomplexed and having a valence from 1 to 3. Suitable ions include: lithium, sodium, potassium, cesium, silver, mercury, copper, beryllium, magnesium, calcium, strontium, barium, cadmium, tin, lead, iron, cobalt, nickel, zinc, aluminum, scandium, yttrium, zirconium, antimony and bismuth. Suitable carboxylic acids are acrylic, methacrylic, 2-acetaminoacrylic, beta,beta-dimethacrylic, ethacrylic, alpha-chloroacrylic, 2-ethyl-3-propylacrylic, cinnamic, acotinic, beta-benzoylacrylic, crotonic, aminocrotonic, allylacetic, 2-allyloxypropionic, 2-furfurylacrylic, vinylacetic, allyloxyacetic, 2-vinylpropionic, phthalic, isophthalic, terephthalic, vinylhydrogen phthalic, beta-acryloxypropionic, 2-butene-1, 4-dicarboxylic, naphthalene dicarboxylic, sorbic, acetylene dicarboxylic, oxalic, N-butylamleamic, maleic, chloromaleic, di-n-butylmaleamic, N,N-dimethylmaleamic, N-ethylmaleamic, N-phenylmaleamic, dichloromaleic, dihydroxymaleic, malonic, succinic, allylarsonic, chlorandic, fumaric, itaconic, styrene-sulfonic, divinylbenzene-sulfonic, styrenephosphonic, styrenesulfinic, glutaric, adipic, pimelic, suberic, azelaic, sebacic, citraconic, mesaconic, acotinic, mellitic, pyromellitic and trimesic.

Such a monomer may be added direct to the resilient elastomer, in which case the monomer should desirably be soluble in the elastomer or readily dispersible in the elastomer under normal rubber-compounding conditions. Alternatively the monomer may be formed in situ in the elastomer by adding precursors of the monomer to the elastomer, for example, adding a basic metal compound to the elastomer and, after dispersing this, adding a suitable polymerizable acid whereby a metal salt of the acid is formed in situ in the elastomer. A particularly useful monomer has been found to be a reaction product of zinc oxide with methacrylic or acrylic acid.

The carboxylic acids listed above do, in themselves, form another group of monomers which may be used in the practice of the invention.

Examples of partial polymers having residual polymerizable unsaturations that may be used are carboxylic polymers such as butadiene-acrylonitrile-acrylic acid, acrylonitrile-butadiene-sorbic acid, styrene-butadiene-sorbic acid, butadiene-vinyl-acrylic acid and butadiene-sorbic acid.

Metal salts of the above listed partial polymers may be used, as may metal salts of other polymerizable acidic organic compounds, for example, sulphonates, sulphinates and phosphonates containing a group having at least one polymerizable olefinic unsaturation, the metal ions being selected from those listed above; and metal salts of compounds such as maleimide, methylmaleimide and phthalimide.

The polyamine amides and imides that may be used include those of the following acids: maleic, itaconic, acrylic, methacrylic, crotonic, citraconic, aconitic and cinnamic.

Examples of suitable allyl and vinyl compounds are di- and triallyl cyanurate; di- and triallylmelamine; vinyl and divinyl benzene; allyl and diallylbenzene; mono-, di-, and triallylmelamine; allyl and diallylamine; allyl ether; allyl glycolates; mono-, di-, tri,- and tetraallyl and vinyl silanes; and triallyl phosphate and phosphite.

Examples of suitable low molecular weight reactive polymers are polymers of butadiene, isoprene, chloroprene and epoxidized derivatives of these materials.

When the monomer is grafted onto the elastomer, it is necessary to use a polymerization initiation technique. Preferably a free radical initiator is used, such as a peroxide, hydroperoxide, persulphate, azo compound, hydrazine or amine oxide. The peroxide compounds are particularly preferred, for example, dicumyl peroxide, lauroyl peroxide, benzoyl peroxide, di-t-butyl peroxide, 2,4-dichlorobenzoyl peroxide, 2,5-di-methyl-2, 4-di(t-butylperoxy) hexane, n-butyl-4,4-bis(t-butylperoxy) valerate, t-butylhydroperoxide, azobis-isobutyronitrile and t-butyl perbenzoate. Ionizing radiation, ultraviolet light or heat may alternatively be used.

In order to vary the density so that the center will have desired weight and the resultant ball will not exceed the maximum allowable weight it will be necessary to include a filler in the center composition. Any conventional filler may be used, and this should be in finely divided form, usually less than 20 mesh U.S. standard screen size and preferably less than 60 mesh. Suitable fillers are silica, silicates, metal carbonates, metal oxides, barytes, litharge, lead sulphide, carbon black, cork titania, cotton flock, cellulose flock, leather fiber, plastic fiber, plastic flour, leather flour, talc and fibrous fillers, e.g., asbestos, glass and synthetic fibers. A filler with a high specific gravity is preferred. Impact modifiers such as ultra-high molecular weight polyethylene and acrylonitrile-butadiene-styrene resin can also be used.

The amounts of monomer, filler and free radical initiator that are required will vary according to the elastomer or blend of elastomers used in the center. Generally speaking the amount of monomer used is no more than required to give a center with a hardness of from 60° -80° Shore C. Higher amounts of monomer tend to affect adversely the rebound of a ball including the center. To this end, the amount of monomer will usually not be more than 25 parts per 100 parts of elastomer. As will be understood by those skilled in the art, many of the monomers listed herein will not give the desired hardness at these low levels, and it is therefore preferred to use either the metal salt of an unsaturated carboxylic acid, or a polyol ester or anhydride of a polybasic unsaturated carboxylic acid, which monomers will generally give the desired hardness in parts considerably less than 25 by weight, and thus lead to a ball with good rebound properties. Specifically, from 5 to 20 parts by weight of monomer are preferred. All parts given in this specification are parts by weight. Any amount of elastomer other than polybutadiene that is present in the center may increase the amount of monomer needed to develop a given hardness, as other elastomers may not cross-link as efficiently as polybutadiene.

The amount of filler is dictated by the relative amounts of elastomer and monomer, by the type of filler and by the size of the center. Generally speaking the amount of filler will be of the order of from 70 parts to 300 parts per hundred parts of elastomer, the amount used being less for centers of balls of 1.68 inches diameter than for centers of balls of 1.62 inches diameter. Preferably from 135 parts to 300 parts of filler per hundred parts of elastomer are used.

These filler levels are remarkably high, particularly in combination with monomer amounts of less than 25 parts per hundred parts of elastomer, and it is surprising that balls made with centers of such compositions have such good rebound and play qualities, as the tendency of high filler levels is generally to deaden the resilience of the compound.

The invention thus extends to a novel composition of matter, comprising by weight 100 parts of a resilient elastomer, not more than 25 parts of a monomer capable of grafting, cross-linking or chain-extending the elastomer and not less than 70 parts, preferably not less than 135 parts, of inert filler, the composition being cured and having a Shore C hardness of not less than 60°.

Such a composition may be free from any antioxidant, which is again an unusual feature of compounds for use in golf ball manufacture and leads to a small cost saving.

It may be desirable to include a silane coupling agent in the composition, to promote adhesion between the filler and the elastomer and thereby obtain a small increase in hardness without adversely affecting the rebound properties. Particularly suitable silane coupling agents are those having the formula:

$R_1(R_2)(R_3)—Si—(CH_2)_x—R_4$.

In the above formula at least one, usually two or all three of $R_1$, $R_2$ and $R_3$ are hydrolyzable to give hydroxyl groups. Typical of such hydrolyzable groups are alkoxy, halogen and metal and non-metal salts. The non-hydrolyzable group is usually alkyl. $x$ equals 0, 1, 2 or 3. $R_4$ is an organic functional group capable of entering into chemical reaction to form a bond with the resilient elastomer or with a resin that may also be present in the composition, and may contain one or more reactive groups, e.g., vinyl, amino, epoxy, hydroxy, carboxy, mercapto, ether or ester groups. A list of silane coupling agents is published in Section 14A of the Reprints of the 17th Annual Technical & Management Conference of the Reinforced Plastics Division of the Society of the Plastics Industry held in Chicago in February, 1962. Particularly preferred silane coupling agents are gamma-mercapto propyl trimethoxy silane, vinyl tris-(beta-methoxy ethoxy) silane, gamma-methacryl oxypropyl trimethoxy silane and n-beta(aminoethyl)-gamma-amino propyl trimethoxy silane.

When peroxides are used as free radical initiators they may generally be present in amounts of about 0.2 to 10 parts per hundred parts of elastomer. Higher loadings will provide harder centers.

The materials used for the thread and the cover of a ball having a center as aforesaid are not critical and may be chosen from conventional materials. The thread is preferably a natural or synthetic polyisoprene and, as already stated, can be wound conventionally or using a double winding technique wherein two threads are fed to the upper part of the center and are wound thereon simultaneously by rotating the center through the agency of a transversely inclined belt on which the lower part of the center rests. The cover may be balata or a balata-like material, or one of the many substitutes for balata that have been proposed as golf ball covers. Particularly preferred is an ionomer, that is, a plastic material in which a copolymer of a mono-olefin with an unsaturated carboxylic acid is combined with a metal. Such a material is exemplified by the product known as "Surlyn A," manufactured and sold by Du Pont.

The invention will now be further described with reference to the following examples.

EXAMPLE 1

Mixes A to D as shown below were intimately blended in a Banbury mixer, and the mixes were molded into 1.0625 inches diameter golf ball centers at 170° C. for 10 minutes.

Table A

| Parts by weight | A | B | C | D |
|---|---|---|---|---|
| Cis-polybutadiene | 75 | 75 | 75 | 75 |
| Natural Rubber | 25 | 25 | 25 | 25 |
| Barytes | 256 | 256 | 258 | 249 |
| Trigonox 17/40[1] | — | 5 | 5 | 5 |
| Di-Cup 40C[2] | 5 | — | — | — |
| Zinc oxide-methacrylic acid reactin product | — | 10 | 15 | 20 |
| Center Hardness (Shore C) | 51° | 62° | 71° | 73° |
| Center Weight (gms) | 20.2 | 18.1 | 20.7 | 20.7 |
| Center Rebound (ins) | 71 | 74 | 71 | 69 |

[1]Trademark of Noury & Van Der Lande N.V.
[2]Trademark of Hercules Incorporated.

The cis-polybutadiene had 98% cis-content. Trigonox 17/40 is n-butyl-4, 4-bis (t-butylperoxy) valerate; Di-Cup 40C is 40% dicumyl peroxide on a calcium carbonate carrier. The reaction product is the result of reacting equal molar quantities of zinc oxide and methacrylic acid, and analyses to show the presence of about 90% zinc monomethacrylate, 5% zinc dimethacrylate and 5% zinc oxide by weight. Center hardness was measured conventionally on the Shore C scale, the rebound was measured after dropping the center from a height of 100 inches in the conventional test.

It can be seen that the use of the reaction product gives a large increase in hardness for very little change in rebound.

Centers made according to Mixes A, C and D were then incorporated into golf balls by winding a single strand of elastomeric thread onto the centers and molding Surlyn A covers onto the cores so formed. The thread and cover materials were taken from the same batch for all the balls, and all the balls were made on the same press under identical molding conditions. Centers according to Mix A were frozen before winding, centers according to Mixes C and D were not frozen. An attempt to use unfrozen centers of Mix B failed as the centers burst during winding. One in twelve centers of Mix C burst during winding; no centers of Mix D burst. The resulting balls were X-rayed to determine the sphericity of the core. Balls with centers of Mix C were rejected, as the centers were too distorted after winding; all balls with centers of Mix D were acceptable. Other characteristics of the finished balls were as follows:

Table B

|  | A | B | C |
|---|---|---|---|
| Flight Distance | 211 yards | 232 yards | 228 yards |
| Total Distance | 239 yards | 249 yards | 251 yards |
| Ball Compression | 81 | 84 | 85 |

It can be seen that flight advantage is obtained with only a marginal increase in ball compression, measured on a standard golf ball compression test machine.

EXAMPLE 2

In order to increase hardness with low loadings of zinc oxide-methacrylic acid reaction product and to increase rebound, the work above was repeated with the omission of natural rubber. Natural rubber is necessary in the standard golf ball center recipe, Mix A, to enable the centers to be frozen. If the centers are not to be frozen, then polybutadiene may be used as the whole of the elastomeric content of the center. The Mixes A, E, F, G shown below were prepared and molded into centers and tested as described in Example 1.

Table C

| Parts by Weight | A | E | F | G |
|---|---|---|---|---|
| Cis-polybutadiene | 75 | 100 | 100 | 100 |
| Natural rubber | 25 | — | — | — |
| Barytes | 256 | 254 | 256 | 258 |
| Zinc oxide-methacrylic acid reaction product | — | 5 | 10 | 15 |
| Trigonox 17/40 | — | 5 | 5 | 5 |
| Di-Cup 40C | 5 | — | — | — |
| Center Rebound (ins) | 71 | 80 | 80 | 77.5 |
| Center Weight (gms) | 20.2 | 20.4 | 20.4 | 20.6 |
| Center Hardness (Shore C) | 51° | 66° | 73° | 77° |

Both hardness and rebound are increased by omitting natural rubber from the mixes. During manufacture of balls as described in Example 1, none of the centers made from Mixes E, F or G burst. Centers from Mix E exhibited heavy distortion in X-ray tests, centers from Mix F showed slight distortion but were acceptable, while centers from Mix G showed virtually no distortion. Other characteristics of the finished balls were as follows:

Table D

|  | A | E | F | G |
|---|---|---|---|---|
| Flight | 209 yards | 212 yards | 226 yards | 226 yards |
| Total | 236 yards | 238 yards | 245 yards | 242 yards |
| Compression | 80 | 85 | 86 | 85 |

The improved flight distance will again be noted.

In order to check balls having unfrozen centers for feel and click, a random selection of balls of standard construction and of the unfrozen center construction were given to low and medium handicap golfers. The majority of balls of both constructions were liked by all the golfers and there was no clear distinction drawn between feel and click of the two types of ball.

EXAMPLE 3

A batch of center material was mixed on production equipment from the following ingredients: 100 parts cis-polybutadiene, 15 parts zinc oxide-methacrylic acid reaction product, 258 parts barytes and 5 parts Trigonox 17/40. Centers molded from this batch had a rebound of 76 inches and a hardness of 70° – 72° Shore C. Four batches of balls were made with these centers, two of the batches having the centers wound conventionally with a single thread and the other two having the centers wound with a double thread. All the balls were subjected to X-ray testing. Of the single wound balls, 33% of the first batch and 28% of the second batch were rejects, and the acceptable balls showed some deformation of the centers. Of the double wound balls, 6% of the first batch and none of the second batch were rejects and the acceptable balls all had virtually perfect centers. This illustrates the advantage of using the double winding technique, particularly with centers having hardnesses at the lower end of the preferred range.

EXAMPLE 4

This example illustrates the use of a polyol ester of methacrylic acid as the monomer component of the composition, and also the use of different elastomers. The following mixes were made and molded into centers as described in Example 1.

Table E

| Parts by Weight | H | J | K | L | M |
|---|---|---|---|---|---|
| Cis-polybutadiene | 100 | 100 | 100 | — | — |
| Natural rubber | — | — | — | 100 | — |
| Styrene-butadiene rubber | — | — | — | — | 100 |
| Barytes | 256 | 256 | 267 | 250 | 250 |
| Trigonox 17/40 | 5 | 5 | 7 | 7 | 7 |
| Sartomer resin SR 350 | 12 | 18 | 15 | 15 | 15 |
| Center Weight (gms) | 20.4 | 20.3 | 20.5 | 19.2 | 19.8 |
| Center Hardness (Shore C) | 75° | 82° | 74° | 52° | 87° |
| Center Rebound (ins) | 76 | 70.5 | 76 | 56 | 29 |

The natural rubber was in the form of ribbed smoked sheet. The styrene-butadiene rubber was a 1509 type and had a 23% styrene content.

These mixes were easier to process than those including a zinc oxide-methacrylic acid reaction product and the hardness and rebound figures in Runs H to K are comparable with those for centers including such a reaction product. Unfrozen centers of Mix K were incorporated into balls, some being wound with a single thread and some with a double thread, the balls having a cover of Surlyn A. X-ray tests showed 20% of the single wound balls to be marginal rejects; the double wound balls included no rejects and were of a very high degree of consistency. Once again, play tests showed no clear distinction between click and feel of these balls and conventional balls. Centers of Mix L could only be wound when frozen, but it is thought that higher levels of resin will give a center hard enough to wind without freezing. The rebound of Mix M is poor, but when incorporated in a ball the flight test figures of 198 yards flight distance and 243 yards total distance compare reasonably with those for Mixes E, F and G.

EXAMPLE 5

This illustrates the different filler levels that are desirable in production runs of balls of 1.62 inches and 1.68 inches diameter. The following mixes were made and molded into centers as described in Example 1.

Table F

| Parts by Weight | N (1.62") | O (1.68") |
|---|---|---|
| Cis-olybutadiene | 100 | 100 |
| Barytes | 260 | 163 |
| Di-Cup KE | 6 | 10 |
| Sartomer resin SR 350 | 12 | 20 |
| Identifying pigment | 0.8 | nil |
| Center hardness (Shore C) | 75 | 78 |
| Center weight (gms) | 20.2 | 16.4 |
| Center rebound (ins) | 71 | 76 |
| Ball weight (gms) | 45.2 | 45.5 |
| Flight distance (yds) | 237 | 244 |
| Total distance (yds) | 252 | 250 |
| Ball compression | 76 | 81 |

Di-Cup KE is 40% dicumyl peroxide on a clay carrier. The centers were wound with a double thread and a cover of Surlyn A was molded onto the wound core. Tests on the centers and the finished balls are shown in the table. The larger diameter ball requires less filler in the center to keep it within the statutory weight limits, and it is advantageous to use somewhat more monomer than in the center for the smaller ball.

EXAMPLE 6

This example shows that polyol esters of carboxylic acid, other than trimethylolpropane trimethacrylate, will give ball centers sufficiently hard to use without freezing, and also that zinc acrylate can be used rather than the zinc oxide and methacrylic acid reaction product shown in Examples 1 to 3. Mixes were made of 100 parts of cis-polybutadiene, 250 parts of barytes, 7 parts of Trigonox 17/40 and 15 parts of the monomers shown below. The mixes were molded into centers as described in Example 1 and the hardness, weight and rebound of the centers were measured.

Table G

| Monomer | Hardness (Shore C) | Weight (gms) | Rebound (ins) |
|---|---|---|---|
| Trimethylolpropane trimethacrylate (SR 350) | 89 | 322 | 69 |
| Trimethylolpropane triacrylate (SR 351) | 82 | 316 | 71 |
| Pentaerythritol tetramethacrylate (SR 367) | 87 | 313 | 73 |
| Pentaerythritol tetracrylate (SR 295) | 76 | 318 | 63 |
| Ethylene glycol dimethacrylate (SR 206) | 80 | 314 | 71 |
| 1,3-butylene glycol dimethacrylate (SR 297) | 80 | 316 | 70 |
| 1,6-hexane diol diacrylate (SR 238) | 72 | 312 | 69 |
| Zinc acrylate (Sr 416) | 97 | 323 | 63 |

The number in parentheses is in each case the Sartomer Resin Inc. reference number.

EXAMPLE 7

This example illustrates the effect of adding a silane coupling agent to the mix. Centers were compounded as shown in the table, and molded and tested as described in Example 1.

Table H

| Parts by Weight | P | Q | R |
|---|---|---|---|
| Cis-polybutadiene | 100 | 100 | 100 |
| Barytes | 260 | 260 | 260 |
| Di-Cup 40C | 6 | 6 | 6 |
| Sartomer resin SR 350 | 12 | 12 | 12 |
| Silane 1 | — | 0.5 | — |
| Silane 2 | — | — | 0.5 |
| Hardness (Shore C) | 75 | 79 | 80 |
| Weight (gms) | 19.7 | 20.1 | 20.2 |
| Rebound (ins) | 71 | 72 | 71 |

Silane 1 and Silane 2 were both gamma-mercaptopropyl trimethoxy silane, the former being sold by Union Carbide under reference A189 and the latter by Dow Corning under reference DC Z 6020. It will be noted that both give a small increase in hardness for no loss in rebound.

EXAMPLE 8

This example illustrates the use of a mixture of a polyol ester in admixture with a zinc oxide-methacrylic acid reaction product. The following mixes were made and molded into centers as described in Example 1.

Table I

| Parts by Weight | S | T | U |
|---|---|---|---|
| Cis-polybutadiene | 100 | 100 | 100 |
| Barytes | 254 | 254 | 254 |
| Trigonox 17/40 | 5 | 5 | 5 |
| Zinc oxide-methacrylic acid reaction product | 20 | 15 | 10 |
| Sartomer resin SR 350 | — | 5 | 5 |
| Center Hardness (Shore C) | 77 | 81 | 77 |
| Center Weight (gms) | 20.8 | 20.4 | 20.7 |
| Center Rebound (ins) | 74 | 69.5 | 72 |

Sartomer Resin SR 350 is trimethylolpropane trimethacrylate.

Mixes T and U were easier to process and mold than M S; however, the properties of the resulting centers showed little difference.

Having thus described our invention, what we claim and desire to protect by Letters Patent is:

1. A golf ball comprising a center, an elastic thread wound around the center to form a core, and a cover molded onto the core, the center being formed from a composition comprising:
   (1) a cis-polybutadiene elastomer having a cis-content of not less than 80%;
   (2) not more than 25 parts by weight per hundred parts of elastomer of a monomer capable of grafting, cross-linking or chain extending the elastomer said monomer is selected from the metal salt of an unsaturated carboxylic acid and a polyol ester or anhydride of a polybasic unsaturated carboxylic acid; and
   (3) not less than 135 parts by weight per hundred parts of elastomer of an inert filler; said composition being cured and having a Shore C hardness of not less than 60° and being characterized by not requiring freezing of the center in order to wind the elastic thread around the center.

2. A golf ball according to claim 1 in which the Shore C hardness is not less than 70°.

3. A golf ball according to claim 1 in which the elastomer consists wholly of polybutadiene having a cis-content of not less than 96% by weight.

4. A golf ball according to claim 1 in which the monomer is the metal salt of an unsaturated carboxylic acid, the metal ion being uncomplexed and having a valence from 1 to 3.

5. A golf ball according to claim 4 in which the monomer is the reaction product of zinc oxide with methacrylic acid or acrylic acid.

6. A golf ball according to claim 1 in which the monomer is present in from 5 to 20 parts by weight.

7. A golf ball according to claim 1 in which the filler is present in from 135 to 300 parts by weight per 100 parts of elastomer.

8. A golf ball according to claim 1 in which the center composition includes a silane coupling agent.

9. A golf ball center composition comprising by weight 100 parts of a cis-polybutadiene elastomer having a cis-content of not less than 80%, not more than 25 parts of a monomer capable of grafting, cross-linking or chain-extending the elastomer said monomer is selected from the metal salt of an unsaturated carboxylic acid and a polyol ester or anhydride of a polybasic unsaturated carboxylic acid and not less than 135 parts of an inert filler, the composition being cured and having a Shore hardness of not less than 60° and being characterized by not requiring freezing in order to wind an elastomeric thread around the center to form a golf ball core.

10. A composition according to claim 9 in which the inert filler is present at about 135 parts to about 300 parts.

11. A composition according to claim 9 in which the elastomer consists wholly of polybutadiene having a cis-content of not less than 96% by weight.

12. A composition according to claim 9 and including a silane coupling agent.

13. A golf ball center composition comprising by weight 100 parts of a cis-polybutadiene elastomer having a cis-content of not less that 80%, not more than 25 parts of a monomer which is a metal salt of an unsaturated carboxylic acid and which is capable of grafting, cross-linking or chain-extending the elastomer and not less than 135 parts of an inert filler, the composition being cured and having a Shore C hardness of not less than 60° and being characterized by not requiring freezing in order to wind an elastomer thread around the center to form a golf ball core.

14. The composition of claim 9 wherein the monomer is methacrylic acid or the zinc salt thereof.

15. The composition of claim 13 wherein the monomer is methacrylic acid or the zinc salt thereof.

16. The composition of claim 1 wherein the filler is barytes.

17. The composition of claim 9 wherein the filler is barytes.

18. The composition of claim 1 wherein the filler is barytes.

19. The golf ball of claim 1 wherein the elastic thread is a double thread.

* * * * *